(12) United States Patent
Yikgeç et al.

(10) Patent No.: US 12,319,136 B2
(45) Date of Patent: Jun. 3, 2025

(54) CARBON COMPOSITE TUBE YOKE

(71) Applicant: TIRSAN KARDAN SANAYI VE TICARET ANONIM SIRKETI, Manisa (TR)

(72) Inventors: Volkan Yikgeç, Manisa (TR); Mehmet Er Kipel, Manisa (TR); Korkut Tasan, Manisa (TR); Ferit Simsaroglu, Manisa (TR); Ramazan Bulur, Manisa (TR)

(*) Notice: Subject to any disclaimer, the term of this patent is extended or adjusted under 35 U.S.C. 154(b) by 23 days.

(21) Appl. No.: 17/759,894

(22) PCT Filed: Nov. 30, 2021

(86) PCT No.: PCT/TR2021/051317
§ 371 (c)(1),
(2) Date: Aug. 1, 2022

(87) PCT Pub. No.: WO2022/132093
PCT Pub. Date: Jun. 23, 2022

(65) Prior Publication Data
US 2023/0143202 A1  May 11, 2023

(51) Int. Cl.
*B60K 17/24* (2006.01)
*F16C 3/02* (2006.01)
*F16D 3/38* (2006.01)
*F16D 3/80* (2006.01)

(52) U.S. Cl.
CPC ............... *B60K 17/24* (2013.01); *F16C 3/02* (2013.01); *F16D 3/80* (2013.01); *F16D 3/387* (2013.01)

(58) Field of Classification Search
CPC .. B60K 17/24; B60K 17/22; F16C 3/02; F16D 3/80; F16D 3/387; B29C 65/00; B29C 65/48; B29C 66/5221

USPC ....... 156/60, 169, 303.1, 293, 294; 464/181, 464/182, 183; 180/379; 428/36.9, 36.91
See application file for complete search history.

(56) References Cited

U.S. PATENT DOCUMENTS

| 5,397,272 | A | * | 3/1995 | Smiley | .................... F16C 3/026 464/181 |
| 5,601,493 | A | * | 2/1997 | Nakazono | ............... F16C 3/026 464/181 |
| 2004/0082394 | A1 | | 4/2004 | Lee et al. | |

FOREIGN PATENT DOCUMENTS

| EP | 0668446 A1 | 8/1995 |
| WO | 2014005584 A1 | 1/2014 |

OTHER PUBLICATIONS

International Search Report for corresponding PCT/TR2021/051317 dated Feb. 4, 2022.
Written Opinion of the International Searching Authority for corresponding PCT/TR2021/051317 dated Feb. 4, 2022.

* cited by examiner

*Primary Examiner* — Philip C Tucker
*Assistant Examiner* — Brian R Slawski
(74) *Attorney, Agent, or Firm* — Egbert, McDaniel & Swartz, PLLC

(57) ABSTRACT

A tube yoke used in a propeller shaft, which provides power transmission in vehicles. The tube yoke has a body made of composite pre-preg material, which has an extension surface in the form of a yoke on one end and in the form of a tube on the other end, which is attached to the propeller shaft tube by bonding or tight fitting.

7 Claims, 4 Drawing Sheets

CARBON COMPOSITE TUBE YOKE

FIELD OF THE INVENTION

The present invention relates to the tube yoke used in the propeller shaft, which provides power transmission in vehicles.

In particular, the present invention relates to the composite tube yoke, which is made of composite pre-preg material and connected to the propeller shaft by bonding the same to the tube or by fixing or joining the same by tight fitting and providing the lightening of the propeller shaft.

PRESENT STATE OF THE ART

A propeller shaft is used so as to transfer the power generated by an engine. The propeller shaft is formed by the assembly of components, which are generally expressed as tubes, yoked parts, universal joints, sliding joints and fixed joints. In fact, what is meant with the propeller shaft is a complete propeller shaft assembly.

The present propeller shafts have a high weight since their joints are made of forged steel and their tubes are made of sheet steel. Lightening of the complete propeller shaft assembly is possible by lightening the parts that constitute the propeller shaft. Lightening operations are carried out with optimum designs supported by engineering analysis of the parts that make up the complete propeller shaft assembly. However, in cases where the designs supported by said engineering analyses are not applied, the results are seen where the stress distributions intensify and the strength of the part, in which the stress is concentrated locally, decreases. Inertia effects caused by the weight of the steel part cause the system to oscillate more.

In the state of the art, tubes, tube yokes, and other yoked parts, which are among the parts that constitute the complete steel propeller shaft assemblies, are combined with the help of the welding process. However, it is known that the strength decreases in the joining regions due to the thermal effects in the welding process. For this reason, there is welding fatigue in dynamic conditions due to the HAZ (heat affected zone) in the welding zone. This reduces the fatigue life of the propeller shaft. In addition, the paint and coating processes applied to prevent corrosion of steel parts increase the production costs of the parts.

In the literature, there are applications where aluminium material is used instead of steel in the lightening works of complete propeller shaft assemblies. However, the thermal effects caused by the welding process applied in the junction of aluminium parts further reduce the strength of the aluminium part. In addition to this, warping is a frequently encountered problem due to the heat effect caused by the aluminium material feature. The deviation in the concentricity of the propeller shaft parts as a result of warping creates an unbalance.

Document No EP668446 can be shown as an example to the state of the art in the research made in the literature. Said document relates to the production of composite tube and composite yoke as a single piece by filament winding method. A shaft which has a body portion and a yoke portion formed by at least one end of the body portion is disclosed in said invention. While forming the integrated structure with filament winding method in monolithic composite structures, low fiber orientation angles relative to the position of the pins adversely affect material strength. As it is known in the literature, ±45° fiber orientation provides maximum strength in structures subject to torsion and ±(0°-20°) fiber orientations will have low strength.

Document No WO2014005584 can be shown as another example to the state of the art. Said document relates to production method of propeller shaft from fiber-plastic composite material. A tubular propeller shaft tube and a propeller shaft tube at the end of the propeller shaft tube and a propeller shaft produced by the fiber winding method from a yoke in a monolithic structure are disclosed in said invention. Holes have been drilled on the tube yoke for the cross connection of the tube and tube yoke, which are produced as a single piece. The joint structure is formed with the placement of said cross into the connection holes and the yoked structure. One end of the yoke is in the form of a tubular and monolithic tube yoke, and the other end is arranged in the form of a yoked flange. The problems experienced in the state of the art could not be eliminated due to the fact that the tubular propeller shaft body and the yoke are in a monolithic structure in the propeller shaft of said invention. The main problem of the composite tube and tube yoke structure, which is obtained as a single piece, is that the joint in the limited volume is limited so that it can only operate at a low angle. Where the flanged yoke operates within the boundary of the monolithic structure, the operating angle of the joint is limited by the inner diameter of the tube yoke. This causes the working angle to be limited to low angles.

As a result, in order to solve the abovementioned problems and the insufficiency of the current solutions makes it necessary to make a development in the relevant technical field.

AIM OF THE INVENTION

The present invention relates to a composite tube yoke which eliminates the abovementioned disadvantages and brings new advantages to the relevant technical field.

The main aim of the invention is to lighten the strength of the propeller shaft without reducing the same.

The aim of the invention is to obtain tube yokes made of composite material instead of steel.

Another aim of the invention is to ensure that the tube yoke is connected to the propeller shaft tube by bonding or tight fitting.

In order to fulfil all the aims mentioned above and which may arise from the detailed description, the present invention is a tube yoke used in the propeller shaft that contains propeller shaft tube, comprising a body made of composite pre-preg material with an extension surface in the form of a yoke at one end and an extension surface in the form of a tube at the other end, which is attached to the propeller shaft tube by bonding or tight fitting.

The structural and characteristic features of the present invention will be understood clearly by the following drawings and the detailed description made with reference to these drawings. Therefore, the evaluation shall be made by taking these figures and the detailed description into consideration.

FIGURES CLARIFYING THE INVENTION

DESCRIPTION OF THE PART REFERENCES

10. Body
11. Yoke
    111. Yoke base
12. Hole
13. Shoulder
14. Extension surface
15. Gap
B. Propeller shaft tube

DETAILED DESCRIPTION OF THE INVENTION

In this detailed description, the preferred alternatives of the inventive tube yoke are described only for clarifying the subject matter such that no limiting effect is created.

Figure 1:
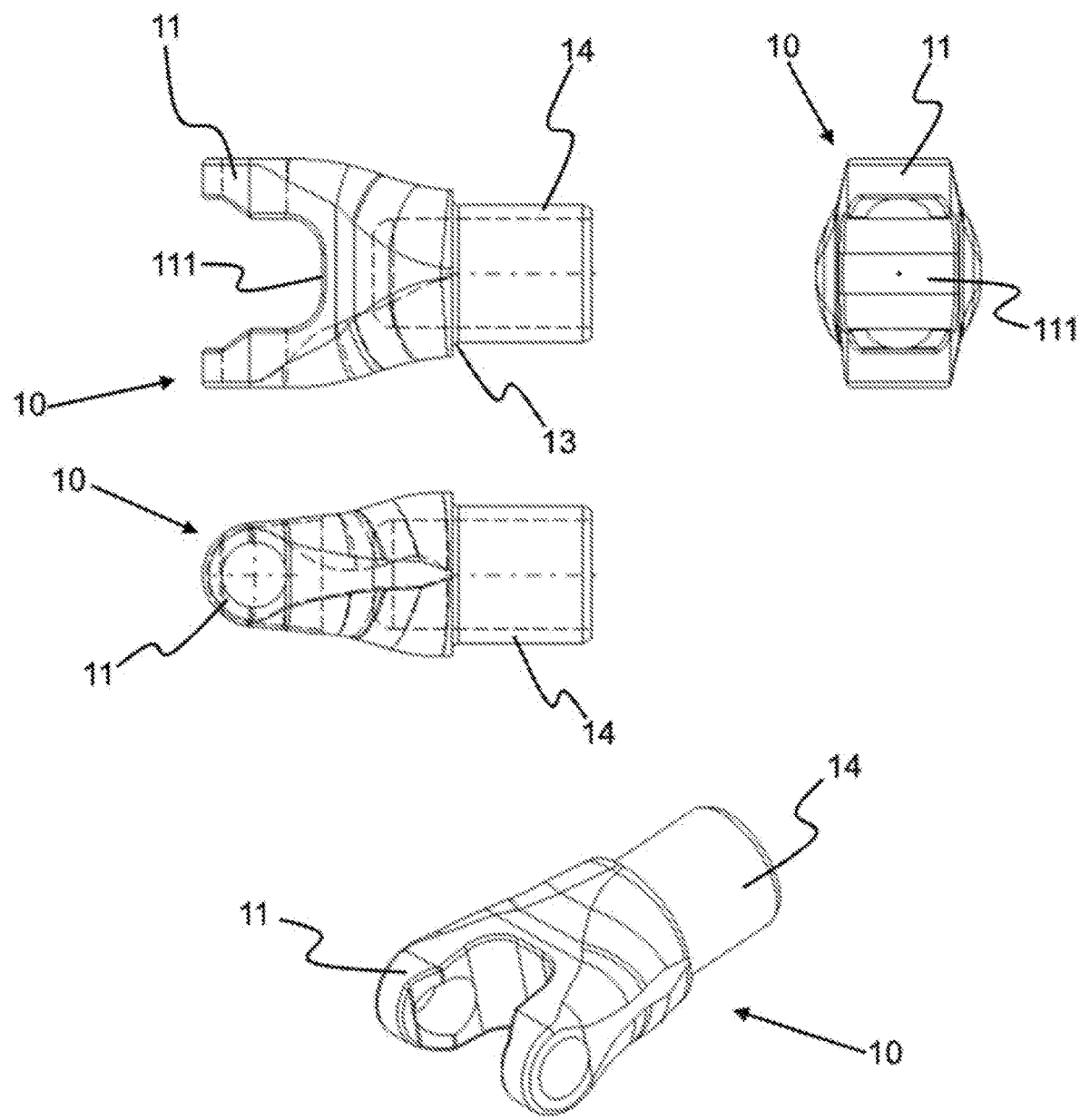
FIG. 1 is a view of the inventive tube yoke.

In FIG. 1, an illustrative view of the inventive tube yoke is given. Accordingly, the tube yoke mainly comprises a body (10) made of composite pre-preg material, which has a yoke (11) form at one end and a tubular extension surface (14) with a hole (12) at the other end.

The body (10) which forms the main structure of the inventive tube yoke is made of composite pre-preg material and one end is in the form of a yoke (11). The other end has a tubular extension surface (14).

Figure 2:
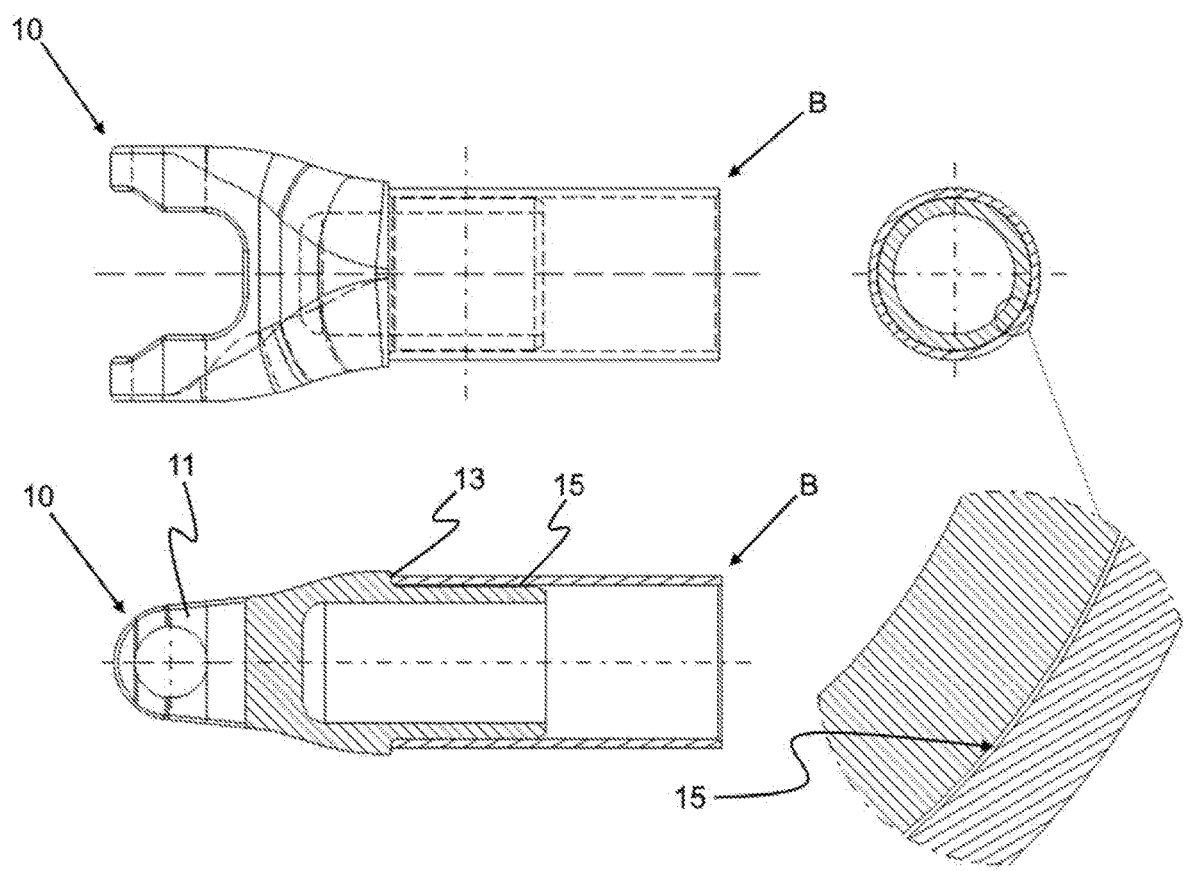
FIG. 2 is an assembled view of the inventive tube yoke with the propeller shaft.

A shoulder (13) can be found on the extension surface (14) in the form of a step or set so as to connect the body (10) with the propeller shaft tube (B). As seen in FIG. 2, the propeller shaft tube (B) is placed on the extension surface (14) by means of the shoulder (13) and combined with the body (10) by means of bonding or tight fitting. In this combining process, a gap (15) is formed between the extension surface (14) and the propeller shaft tube (B) so as to allow the adhesive to be filled between the extension surface (14) and the propeller shaft tube (B) to connect the said body (10) with the propeller shaft tube (B).

Figure 3:
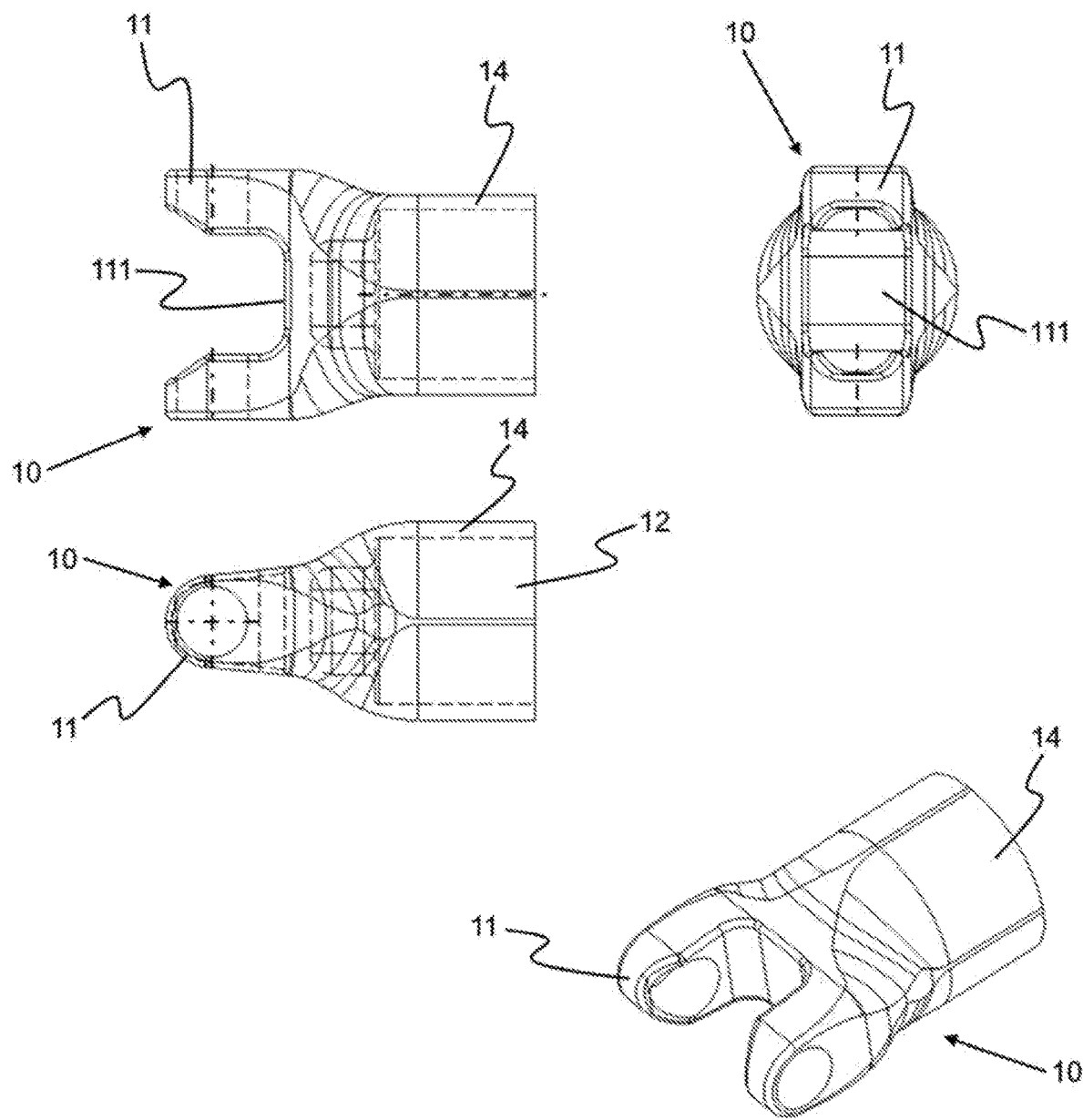
FIG. 3 is a view of the inventive tube yoke in an alternative embodiment of the invention.
Figure 4:
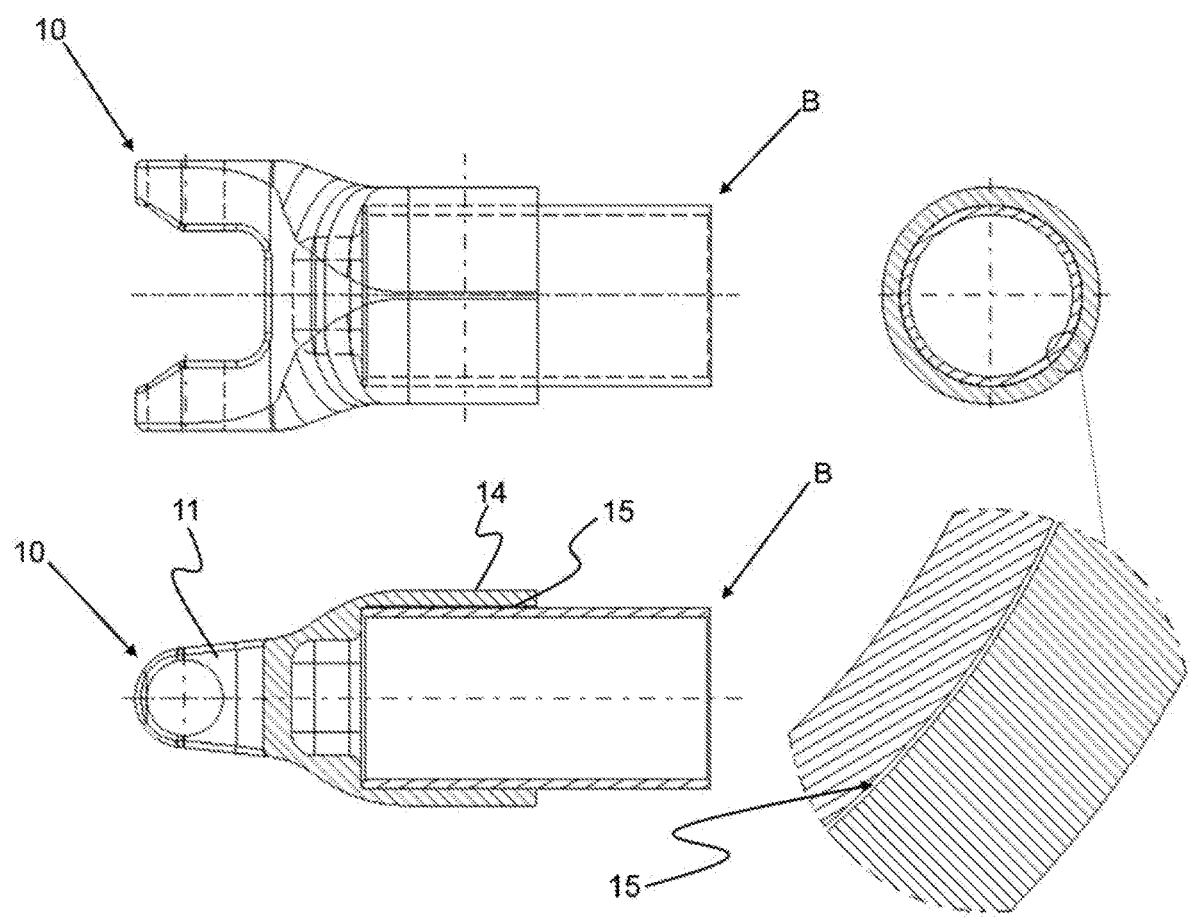
FIG. 4 is an assembled view of the inventive tube yoke with the propeller shaft in an alternative embodiment of the invention.

As seen in FIG. 3, in the alternative embodiment of the invention, the extension surface (14) of the body (10) which has a yoke (11) at one end and a tubular extension surface (14) at the other end may be in flat form. A hole (12) can be found in said extension surface (14) to connect the body (10) with the propeller shaft tube (B) used in the propeller shaft and said hole (12) may extend up to the yoke base (111). In this combining process, a gap (15) can be formed between the hole (12) and the propeller shaft tube (B) so as to allow the adhesive to be filled between the hole (12) and the propeller shaft tube (B). As seen in FIG. 4, the propeller shaft tube (B) is passed through the hole (12) in the extension surface (14), it is combined with the body (10) by means of the adhesive filled into said gap (15).

The invention claimed is:

1. An assembly comprising:
    a propeller shaft having a propeller tube shaft; and
    a tube yoke comprising a body formed of a composite pre-preg material, said body having an extension surface in the form of a yoke at one end and in the form of a tube on the other end, which is attached to the propeller tube shaft by bonding or tight fitting.

2. The assembly of claim 1, wherein the extension surface has a shoulder thereon, the shoulder being of a step form.

3. The assembly of claim 1, wherein the extension surface has a shoulder thereon, the shoulder adapted to connect said body with the propeller tube shaft.

4. The assembly of claim 1, wherein the extension surface has a hole therein so as to allow said body to connect to the propeller tube shaft.

5. The assembly of claim 4, wherein the hole extends to a base of the yoke of the extension surface.

6. The assembly of claim 4, wherein a gap is formed between the hole and the propeller shaft tube, the gap adapted to receive an adhesive therein in order to connect said body with the propeller tube shaft.

7. The assembly of claim 1, wherein a gap is formed between the extension surface and the propeller tube shaft, the gap adapted to allow an adhesive to fill between the extension surface and the propeller tube shaft in order to connect said body with the propeller tube shaft.

* * * * *